US006414634B1

(12) United States Patent
Tekinay

(10) Patent No.: US 6,414,634 B1
(45) Date of Patent: *Jul. 2, 2002

(54) DETECTING THE GEOGRAPHICAL LOCATION OF WIRELESS UNITS

(75) Inventor: Sirin Tekinay, Morristown, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/985,133

(22) Filed: Dec. 4, 1997

(51) Int. Cl.$^7$ ................................................. G01S 3/02
(52) U.S. Cl. ........................ 342/453; 342/457; 342/465
(58) Field of Search .............................. 342/453, 465, 342/457, 418, 387, 458; 455/456, 63, 65

(56) References Cited

U.S. PATENT DOCUMENTS

| | | | | |
|---|---|---|---|---|
| 3,848,254 A | * | 11/1974 | Drebinger et al. | ........... 342/457 |
| 3,869,673 A | | 3/1975 | Close | |
| 4,433,335 A | * | 2/1984 | Wind | ........................ 342/387 |
| 4,604,717 A | * | 8/1986 | Kaplan | ...................... 342/387 |
| 5,029,475 A | | 7/1991 | Kikuchi et al. | |

(List continued on next page.)

OTHER PUBLICATIONS

Quniquas, A. et al, "Multipath Channel Identification with Wavelet Packets", IEEE Journal of Oceanic Engineering, Vo. 22, No. 2 Apr. 1997, pp. 342–346.*

Klukas, R. et al, "Field Tests of a Cellular Telephone Positioning System", IEEE 47th Vehicular Technology Conf., May 1997, Vol. 2, pp. 470–474.*

Garcia, F. et al, "An Arrival Time Estimator for Transient Stochastic Signals Using the Wavelet Transform", Proc. of the 38th Midwest Symposium on Circuits and Systems, 1995, vol. 2, pp. 1110–1113.*

Caffery, J. et al, "Radio Location in Urban CDMA Microcells", 6th Int'l Symp. on Personal, Indoor and Mobile Radio Communication. Wireless: Merging onto the Information Superhighway, Sep. 1995, vol. 2, pp. 858–862.*

Frisch, M. et al, "Detection of a Transient Signal of Unknown Scaling and Arrival Time using the Discrete Wavelet Transform" 1991 Int'l Conf. on Acoustics, Speech and Signal Processing, Apr. 1991, vol. 2, pp. 1313–1316.*

Spencer, Quentin et al. "Indoor Wideband Time/Angle of Arrival Multipath Propagation Results", Vechicular Technology Conference, 1997, IEEE 47th, vol. 3, 1997, pp. 1410–1414.

(List continued on next page.)

Primary Examiner—Gregory C. Issing
(74) Attorney, Agent, or Firm—Harness, Dickey & Pierce, P.L.C.

(57) ABSTRACT

The geolocation of a wireless terminal is determined by performing a time/frequency analysis on incoming signals received at a plurality of locations, where each incoming signal includes at least one multipath component of a signal transmitted by the wireless terminal during, for example, regular communications. The time/frequency analysis involves the analysis of the frequency components of the transmitted signal at given instants in time to identify the time-of-arrival of the multipath components of the incoming signal. The time-of-arrival identified for the line-of-sight component of the incoming signal at a plurality of locations can then be processed to determine the geolocation of the wireless terminal.

8 Claims, 4 Drawing Sheets

U.S. PATENT DOCUMENTS

| | | | |
|---|---|---|---|
| 5,166,694 A | | 11/1992 | Russell et al. |
| 5,257,265 A | | 10/1993 | Su et al. |
| 5,266,953 A | | 11/1993 | Kelly et al. |
| 5,317,323 A | * | 5/1994 | Kennedy .................... 342/457 |
| 5,327,144 A | * | 7/1994 | Stilp et al. .................. 342/387 |
| 5,402,450 A | | 3/1995 | Lennen |
| 5,450,615 A | | 9/1995 | Fortune et al. |
| 5,486,833 A | | 1/1996 | Barrett |
| 5,512,908 A | * | 4/1996 | Herrick ...................... 342/387 |
| 5,542,101 A | | 7/1996 | Pal |
| 5,548,296 A | * | 8/1996 | Matsuno ..................... 342/457 |
| 5,561,841 A | | 10/1996 | Markus |
| 5,574,466 A | | 11/1996 | Reed et al. |
| 5,612,700 A | * | 3/1997 | Tucker ......................... 342/90 |
| 5,630,208 A | * | 5/1997 | Enge et al. .................... 455/65 |
| 5,669,063 A | | 9/1997 | Brockel et al. |
| 5,692,008 A | | 11/1997 | Van Nee |
| 5,710,977 A | | 1/1998 | Nakazawa |
| 5,717,406 A | * | 2/1998 | Sanderford et al. ......... 342/457 |
| 5,742,635 A | | 4/1998 | Sanderford , Jr. |
| 5,764,686 A | | 6/1998 | Sanderford et al. |
| 5,890,068 A | * | 3/1999 | Fattouche et al. .......... 455/456 |
| 5,901,183 A | | 5/1999 | Garin et al. |
| 5,918,161 A | | 6/1999 | Kumar et al. |
| 5,991,454 A | * | 11/1999 | Fowler ....................... 382/251 |
| 6,009,334 A | | 12/1999 | Grubeck et al. |
| 6,259,894 B1 | * | 7/2001 | Tekinay ...................... 455/456 |

OTHER PUBLICATIONS

Fischer, Sven et al. "Time of arrival estimation of narrow-band TDMA signals for mobile positioning" Personal, Indoor and Mobile Radio Communcations, 1998. The Ninth IEEE International Symposium on. vol. 1, 1998, pp. 451–455.

Pahlavan, Kaven et al. "Wideband Radio Propagation Modeling for Indoor Geolocation Applications" IEEE Communications Magazine 0163–6804/98, pp. 60–65.

See, C. et al. "Estimating Directions and Times of Arrival of Multipath Signals Using a Calibrated Space–Time Antenna Array" Statistical Signal and Array Processing, 1998. Proceedings., Ninth IEEE SP Workshop on 1998, pp. 364–367.

Cao et al. "Scattering of complex target within complex environment" Microwave Conference Proceedings, vol. 3, 1997, pp. 1213–1216.

Askew, Robert e. et al. "Suppression of Multipath and Other Interferes Using Electronically Variable Time Delay Elements" Telesystems Conference, 1994. Conference Proceedings., 1994 IEEE National, 1994, pp. 91–94.

Chua, Peng–Hunt et al. Vector–Sensor Array Processing For Estimating Angles and Times of Arrival of Multipath Communication Signals: Acoustics, Speech and Signal Processing, 1998. Proceedings of the 1998 IEEE International Conference on, 1998, pp. 3325–3328.

Ko et al. "A Comparison of 3D Computer Propagation Prediction with GSM Signal Measurements", IEEE 1996, pp. 1172–1176.

Journee, H.L., et al. "Pulse–Wave Time Between the Cervical Carotid and Intracranial Arteries by Means of Wavelet Transform", 18th Annual Int'l Conf. of the IEEE Engineering in Medicne and Biology Society, Amsterdam 1996, pp. 1025–1026.*

Kim, Hyeongdong et al. "Wavelet Analysis of Radar Echo From Finite–Size Targets", IEEE Trans. on Antennas and Propagation, vol. 41, No. 2, Feb. 1993, pp. 200–2207.*

Akujuobi, Cajetan M. et al. "Wavelets and Fractals: Overview of their Similarities Based on Different Application Areas", IEEE, 1992*

Hashemi, Homayoun, "Pulse Ranging Radiolocation Technique and its Application to Channel Assignment in Digital Cellular Radio", Vechicular Technology Conf. 1991, p. 675–680.*

* cited by examiner

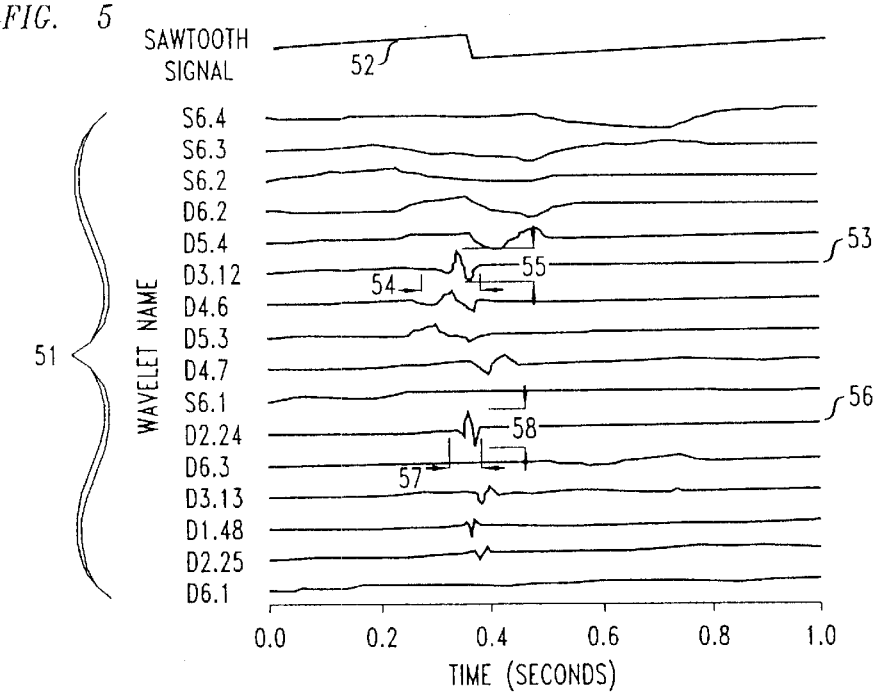
FIG. 5
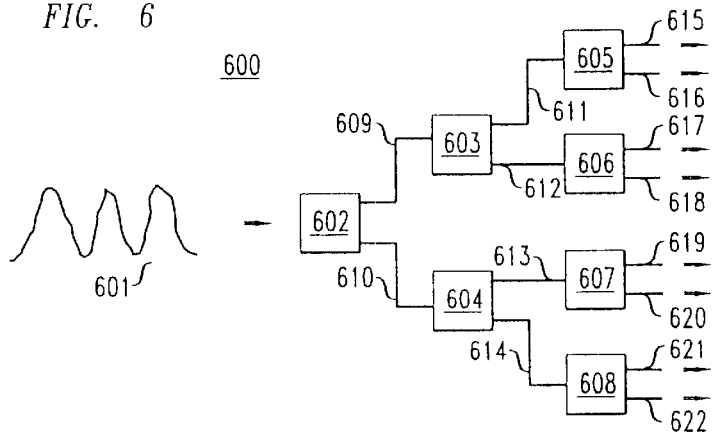
FIG. 6
FIG. 7
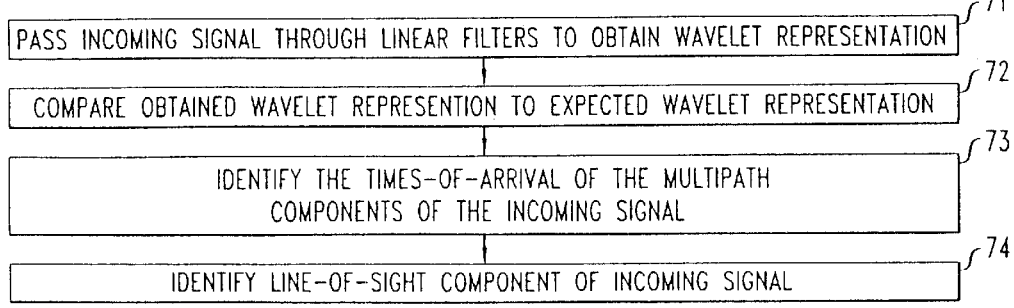

DETECTING THE GEOGRAPHICAL LOCATION OF WIRELESS UNITS

RELATED APPLICATIONS

This invention is related to the inventions disclosed in the applicant's applications: Ser. No. 08/984,779, now U.S. Pat. No. 6,175,811, entitled "Method For Frequency Environment Modeling and Characterization," filed on Dec. 4, 1997; Ser. No. 08/984,728, now U.S. Pat. No. 6,272,350 entitled "Method For Improved Line Of Sight Signal Detection Using Time/Frequency Analysis," filed on Dec. 4, 1997; and Ser. No. 08/984,780, now U.S. Pat. No. 6,259,894 entitled "Method For Improved Line-Of-Sight Signal Detection Using RF Model Parameters, filed on Dec. 4, 1997.

FIELD OF THE INVENTION

The present invention relates to the field of radio communications and, more particularly, to a method and apparatus for locating wireless terminals.

BACKGROUND OF THE INVENTION

There are a number of different types of communications systems that require information regarding the location of an object or element in order to operate efficiently.

For example, some wireless communications systems require information regarding the location of a receiving unit in order to efficiently route signals from a transmitting unit to the receiving unit, and vice versa.

In cellular communications systems, for example, the cellular network (i.e. the network of base stations) requires information regarding the identity of the cell in which a wireless terminal is located in order to efficiently route signals to and from the wireless terminal. Once the cell is identified, the cellular network can send a signal to the wireless terminal through a base station that provides coverage to the identified cell. This enables the cellular network to deliver the signal to the wireless terminal without having to transmit the signal through every base station. As a result, the cellular network is able to avoid consuming bandwidth in those cells in which the wireless terminal is not resident, and thus increase the overall efficiency of the cellular system.

Although present-day cellular networks identify the cell in which the wireless terminal is located, they do not identify the exact geolocation of the wireless terminal in that cell. The term geolocation as used herein refers to the point in two or three-dimensional space defined by a set of coordinates (e.g. longitude and latitude) and/or defined by a vector (i.e. distance and direction) from a known point in space. This lack of geolocation information greatly decreases the efficiency of the cellular system when the wireless terminal moves from cell to cell. In addition, the lack of geolocation information reduces the number of services that a given cellular system can provide (e.g. roadside assistance, fleet management, etc.).

To illustrate, cellular systems in North America presently use a so-called system-wide paging approach to identify the cell in which a wireless terminal is located. Pursuant to that approach, the wireless terminal periodically transmits identification information, referred to as registration, to the cellular network. Depending on the location of the wireless terminal, the registration signal can be received by any number of base stations, each base station covering a specific cell. The cellular network identifies the cell in which the wireless terminal is located by comparing the strength of the registration signal received at each base station. The base station that receives the strongest registration signal is identified as the cell in which the wireless terminal is presently located. Once the "present" cell is identified, the cellular system can then communicate with the wireless terminal through the base station that covers that cell.

If the wireless terminal moves out of the present cell, the cellular system must send a page to the wireless terminal through a plurality of cells and wait for the wireless terminal to send another registration. Once the new registration is received, the cellular system can then identify the new cell in which the wireless terminal is located by comparing the signal strengths, as described above. As a result, the cellular network must consume additional bandwidth to periodically identify the cell in which the wireless terminal is located.

In addition, if the user of the wireless terminal makes a call for help (e.g. because the user is in distress), the wireless network can not identify the geolocation from which the wireless user made the call. As a result, unless the user can accurately identify his or her location, the wireless network can provide only limited help in the dispatch of aid to the user. Thus, present-day cellular systems in North America, for example, are not very useful to other service providers, such as roadside assistance and medical emergency care.

One solution to this problem is to equip the wireless terminal with the ability to identify its own geolocation. For example, the wireless terminal can be equipped with a Global Positioning System (GPS) receiver that receives GPS signals and uses those signals to determine the geolocation of the wireless terminal. Once determined, the geolocation information can be periodically sent to the cellular network. This would enable the cellular network to periodically identify the geolocation of the wireless terminal without having to consume additional bandwidth sending pages. In addition, this solution would enable the cellular network to track the movement of the wireless terminal from cell to cell, and thus predict and/or anticipate the time to hand-off communications from one cell to the next. As a result, this solution would enable the cellular network to increase the overall efficiency of communications, and to provide additional information to service providers such as roadside assistance providers (e.g. to located a user in distress).

The just described solution, however, is disadvantageous because the additional hardware needed to equip the wireless terminal with the ability to identify its own geolocation would increase the price, size and weight of the wireless terminal to unappealing proportions. Indeed, there is an ongoing effort by those skilled in the art to reduce the price, size and weight of present-day wireless terminals (e.g. cell phones).

Techniques are known, outside the cellular communications arena, for identifying the geolocation of a transmitting unit. For example, in some satellite communications systems, the geolocation of a transmitting unit is identified by determining the times in which the line-of-sight components of a signal transmitted from the transmitting unit reached a respective receiver locations. The line-of-sight component of the so-called incoming signal at each receiver location is that component of the signal that propagated directly from the wireless terminal to the location at which the signal was received (i.e. the receiver location) without scattering or reflecting off structures in the environment. To determine the time-of-arrival of the line-of-sight component of the incoming signal, such satellite geolocation systems assume that the first-arriving component of the incoming signal is the line-of-sight component. Then, based on the time-of-arrival of the first-arriving component of the incoming signal at, for example, three receiver locations, the geolocation of the wireless terminal is calculated.

Such conventional geolocation systems, however, are hindered by their failure to consider the problems associated with scattering in the RF environment. Scattering refers to the phenomenon wherein signals traveling in an RF environment reflect off structures in the environment, and thus scatter in various different directions or paths in the RF environment. Specifically, scattering may cause a signal to travel more than one path between two points (e.g. a wireless terminal and a receiver location) in an RF environment. This so-called multipath phenomenon may cause an incoming signal at a receiver location to be composed of a plurality of so-called multipath components (i.e. repeated versions of the transmitted signal). Thus, depending on the propensity of the RF environment to scatter a signal, referred to herein as the scattering hostility, the incoming signal at the receiver location may be composed of a number of such multipath components.

Scattering and/or multipathing may cause the first-arriving component of the incoming signal to arrive at the receiver location very close in time to the time-of-arrival of the next-arriving multipath component of the incoming signal. A conventional geolocation system may not be able to distinguish between the two components, causing it to mistakenly determine that the time of arrival of the first-arriving component is at some intermediate time between the time of arrival of the first-arriving component and the time-of-arrival of the next-arriving multipath component, i.e., a later time than the first-arriving component actually arrived. This so-called time-shift of the identified time-of-arrival may cause the geolocation system to determine an incorrect geolocation of the wireless terminal.

In addition, depending on the scattering hostility of the RF environment, the line-of-sight path between a wireless terminal (i.e. the transmitting unit) and a base station (i.e. the receiver location) may be blocked (e.g. by a building). When this happens, the first-arriving component of the incoming signal (at the receiver location) will not be the actual line-of-sight component, but rather some later-arriving component. Again, this would cause the conventional geolocation systems to incorrectly assess the time-of-arrival of the line-of-sight component as being received at a later point in time, i.e. time-shifted, thereby causing the geolocation system to inaccurately calculate the geolocation of the wireless terminal.

As a result, it can be understood that there are at least two different mechanisms wherein scattering and/or multipathing may cause a so called time-shift of the determined time-of-arrival of the line-of-sight component of the incoming signal, and thus be problematic to the accuracy of identifying the geolocation of a wireless terminal by conventional geolocation systems.

SUMMARY OF THE INVENTION

The above-described problems are ameliorated in accordance with the principles of the invention. In particular, the geolocation of a wireless terminal is determined by a performing a time/frequency analysis of a signal transmitted by the wireless terminal during, for example, regular communications. This approach allows the terminal to be identified with more accuracy than is achieved by attempting to identify the time-of-arrival of the first-arriving multipath component of the incoming signal; without having to add substantial hardware to the wireless terminal, and without having to consume additional bandwidth on the wireless network with which the wireless terminal communicates.

The term time/frequency analysis as used herein refers to an analysis of the frequency components (i.e. the frequency make-up) of a signal at given instants in time. For example, one form of time/frequency analysis according to the present invention is to compare the frequency make-up of the received signal to the frequency make-up of the transmitted signal. Those points in time in which the frequency make-up of the received signal matches the frequency make-up of the transmitted signal are the instants in time at which a particular component of the transmitted signal is received.

In accordance with a feature of the invention, the time/frequency analysis is used to identify the time-of-arrival of the line-of-sight component of the incoming signal. By performing such a time/frequency analysis on the line-of-sight components of the incoming signals received at, for example, three locations, the geolocation of the wireless terminal can be identified with better accuracy than in the prior art because the identified time-of-arrival at each location is more accurate than that identified in the prior art.

In preferred embodiments, the accuracy of the identified time-of-arrival of the line-of-sight component of the incoming signal at each receiver location is improved by an amount based on the value of at least one parameter of an RF model that characterizes the scattering hostility of the RF environment in which the respective incoming signal traveled. By adjusting the time-of-arrival in this way, the above-discussed time-shift due to scattering is compensated for, and thus more accurately reflects the time at which the line-of-sight component of the incoming signal would have arrived if the RF environment were scatter-free. This increased accuracy of the identified time-of-arrival of the line-of-sight component of the incoming signal will cause an increase in the accuracy of the determination of the geolocation of the wireless terminal.

In particular embodiments, the time/frequency analysis may advantageously be carried-out using the signal processing disclosed in co-pending application Ser. No. 08/984,728, entitled "Method For Improved Line Of Sight Signal Detection Using Time/Frequency Analysis," filed on even date herewith.

In addition, in particular embodiments, an identified time-of-arrival of the line-ofsight component of the incoming signal can be adjusted using the methods disclosed in co-pending application, Ser. No. 08/984,780, entitled "Method For Improved Line-Of-Sight Signal Detection Using RF Model Parameters," filed of even date herewith.

Also, in particular embodiments, the parameters of the RF model used to adjust the identified times-of arrival can be advantageously carried-out using the methods disclosed in co-pending application Ser. No. 08/984,779, entitled "Method For Frequency Environment Modeling And Characterization," filed of even date herewith.

BRIEF DESCRIPTION OF THE DRAWING

FIG. 5 is a graphical view of a wavelet representation of a sawtooth signal helpful in explaining how, in preferred embodiments, the above-described time shift is determined.

FIG. 6 is a block diagram of a set of linear filters that can be used to decompose an incoming signal into a set of frequency components in order to identify the time-of-arrival of a component of the incoming signal.

FIG. 7 is a block diagram of an illustrative embodiment of a method for using wavelet analysis as a form of time/frequency analysis to identify the line-of-sight component of an incoming signal in accordance with the principles of the present invention.

DETAILED DESCRIPTION OF ILLUSTRATIVE OF THE INVENTION

Figure 1:
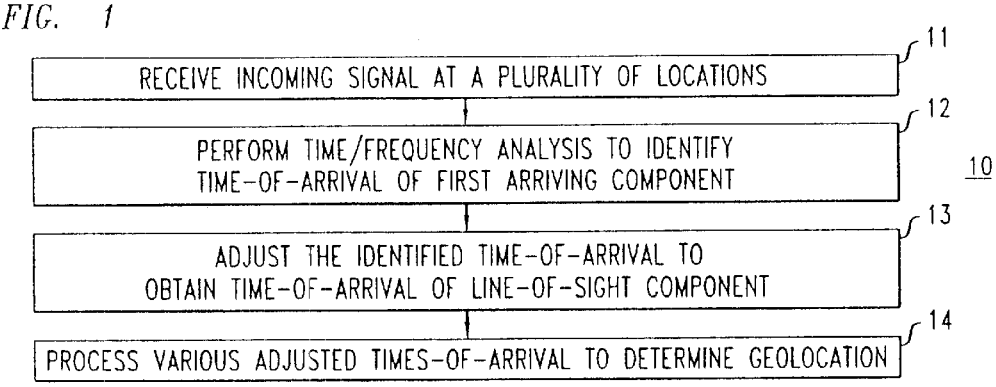
FIG. 1 is block diagram of an illustrative embodiment of a method for determining the geolocation of a wireless terminal in accordance with the principles of the present invention.

Referring now to FIG. 1 there is shown a method 10 for determining the geolocation of a wireless terminal in accordance with the principles of the present invention. As shown, method 10 begins with step 11 wherein a signal transmitted by the wireless terminal is received at a plurality of receiver locations. The signal received at each receiver location is referred to herein as the incoming signal. A time/frequency analysis is performed, in accordance with the principles of the present invention, on each incoming signal, at step 12, to identify the time-of-arrival of the first-arriving multipath component of the respective incoming signal at each receiver location. The identified time-of-arrival of the first-arriving multipath component at each location is adjusted, at step 13, by an amount based on the value of at least one parameter of an RF model that characterizes the scattering hostility of the RF environment in which the respective incoming signal traveled. The resultant "adjusted" time-of-arrival of the first-arriving component of each incoming signal more accurately reflects the time the line-of-sight component of the incoming signal would have reached the respective receiver locations if the RF environment were scatter-free. The various "adjusted" times-of-arrival are then processed, at step 14, to determine the geolocation of the wireless terminal.

In order to more fully explain the operation of method 10, the following topics will be addressed: (1) the incoming signal; (2) the line-of-sight and multipath components of the incoming signal; (3) the "time-shift" of the line-of-sight component of the incoming signal due to scattering; (4) time/frequency analysis of the incoming signal in accordance with the principles of the present invention; (5) identifying the time-of-arrival of the line-of-sight component of the incoming signal in accordance with the principles of the present invention; (6) using an RF model to reduce a "time-shift" of the identified time-of-arrival of the line-of-sight component of the incoming signal, due to scattering; (7) determining parameters that form the RF model used to reduce the time shift; and (8) using the time-of-arrival of the line-of-sight component of the incoming signal received at a plurality of locations to determine the geolocation of the wireless terminal, in accordance with the principles of the present invention.

The Incoming Signal

The incoming signal can be any signal transmitted by the wireless terminal including those signals transmitted during wireless communications. The term regular communications as used herein refers to the communications the wireless terminal regularly performs when in operation, for example, communications involving a call between the user of a cell phone and another party.

Line-Of-Sight and Multipath Components

Figure 2:
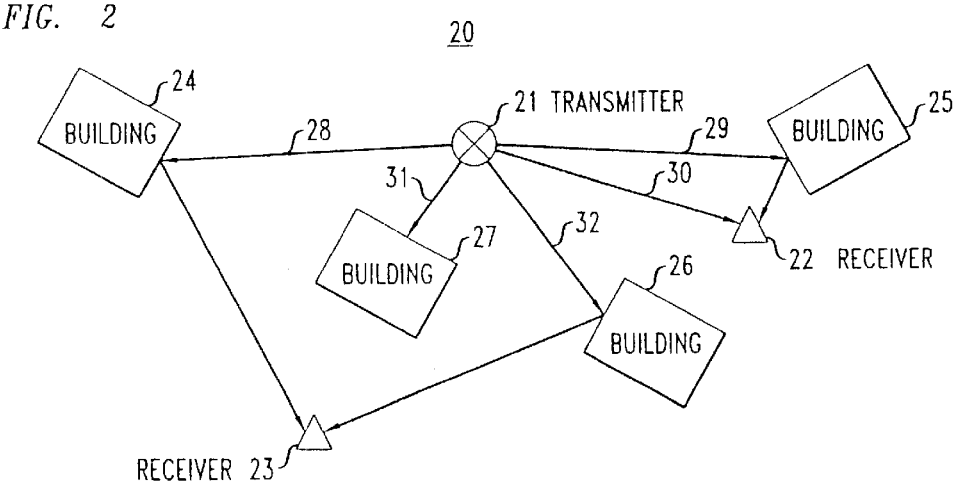
FIG. 2 is a top-view of the paths of the line-of-sight and multipath components of a signal traveling from a wireless terminal to a plurality of receiver locations in an RF environment.

As described above, the incoming signal may be composed of any number of multipath components of the transmitted signal, depending on the scattering hostility in the RF environment in which a signal travels. An illustration of the physical process by which various multipath components arrive at different receiver locations in an RF environment 20 is shown in FIG. 2. As shown, a wireless terminal 21, buildings 24–27 and receiver locations 22 and 23 are all located at different positions in RF environment 20. Depending on the position of wireless terminal 21 with respect to buildings 24–27 and receiver locations 22 and 23, a signal transmitted from wireless terminal 21 travels a plurality of paths 28–32 therefrom. Specifically, a signal transmitted from wireless terminal 21 travels to receiver location 22 along line-of-sight multipath, or line-of sight path, 30 and multipath 29, and to receiver location 23 along multipaths 28 and 32.

Time-Shift Due to Scattering

The incoming signal received at receiver location 22 has both a line-of-sight component (i.e. the component that traveled along line-of-sight path 30) and a multipath component (i.e. the component that traveled along multipath 29). Since the multipath component travels a longer distance then the line-of-sight component, the time-of-arrival of the multipath component is later than the time-of-arrival of the line-of-sight component.

Figure 3:
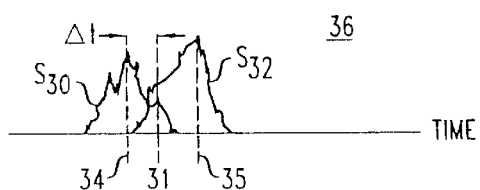
FIG. 3 is a graphical view of the various components of an illustrative incoming signal received at a receiver location shown in FIG. 2.

Referring now to FIG. 3 there is shown a graphical view of the line-of sight component $S_{30}$ and the multipath component $S_{32}$ of an incoming signal received at receiver location 22, where the incoming signal is shown in FIG. 3 as signal 36. As shown, the line-of sight component $S_{30}$ of signal 36 has a time-of-arrival 34 and the multipath component $S_{32}$ of signal 36 has a time-of-arrival 35. As stated above, if time-of-arrival 34 and time-of-arrival 35 are very close in time, conventional geolocation devices that use matched filters to determine the time-of-arrival of the line-of-sight component may inaccurately determine that the line-of-sight component $S_{30}$ of incoming signal 36 arrived at time 31, which is $\Delta t$ later than it actually arrived. When this happens, the identified time-of-arrival (i.e. time 31) of the line-of-sight component $S_{30}$ is said to be "time-shifted" by the time shift $\Delta t$ due to scattering and/or multipathing in the RF environment.

The time shift $\Delta t$ due to such close-arriving multipaths can be reduced by performing a time/frequency analysis on the incoming signal in accordance with the present invention, as described below.

Referring now back to FIG. 2, the incoming signal received at receiver location 23 has two multipath components, i.e., the components that traveled along multipaths 28 and 32. However, it has no line-of-sight component because line-of-sight path 31 is blocked by building 27. Since such multipath components travel a farther distance in RF environment 20 than would the line-of-sight component if it had not been blocked by building 27, the time-of-arrival of each multipath component is therefore, by definition, later than the time at which the line-of-sight component would have arrived at receiver location 23.

Figure 4:
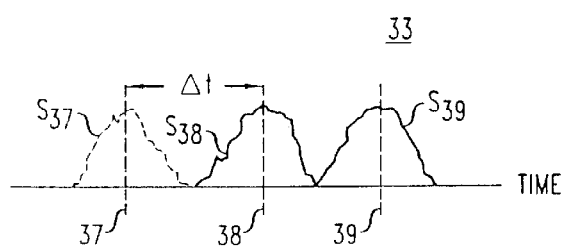
FIG. 4 is a graphical view of the various components of an illustrative incoming signal received at another receiver location shown in FIG. 2.

Referring now to FIG. 4, there is shown a graphical view of an incoming signal 33 received at receiver location 23. As shown, incoming signal 33 includes a multipath component S38 that traveled along path 28, a multipath component S39 that traveled along path 32, and an expected line-of-sight component S37 that never reaches location 23 because it is blocked by building 27. The multipath components s38 and s39 are shown to have times-of-arrival 38 and 39 respectively, and expected line-of sight component s37 is shown to have an expected time-of-arrival 37, which is the time-of-arrival that line-of sight component s37 would have had to receiver location 23 had it never been blocked by building 27. Since a conventional geolocation system, as described above, would assume that the line-of-sight component of incoming signal S33 is the iving component, such a geolocation system would incorrectly assume that the time-of-arrival of the line-of-sight component of incoming signal 33 is time 38, as opposed to time 37. When this happens, the geolocation system would incorrectly assume that the time-of-arrival of the line-of-sight component s37 was a time shift $\Delta t$, i.e., time difference between time 37 and time 38, later than it should have arrived. As described above, such a time shift would reduce the accuracy of the geolocation system in determining the geolocation of wireless terminal 21.

The time shift $\Delta t$, due to such a blocked line-of-sight path, can be reduced by adjusting the identified time-of-arrival of the first-arriving component of the incoming signal by an amount based on a parameter that characterizes the scattering hostility of the RF environment in which the incoming signal traveled.

Time/Frequency Analysis

The term time/frequency analysis as used herein refers to an analysis of the frequency components of a signal (e.g. the magnitude of the waveform at each component frequency of the signal) at given instants in time. For example, one form of time/frequency analysis, in accordance with the principles of the present invention, is to compare the frequency components of the incoming signal to the frequency components of the transmitted signal at given instants in time. (Although the exact nature of the transmitted signal is not typically known, its frequency components can indeed be known to a great extent since they are a function of the carrier frequency and the modulation used.) In such a time/frequency analysis, those instants in time in which the frequency components of the incoming signal match the frequency components of the transmitted signal are the instants in time at which a multipath component is received.

One illustrative method for performing a time/frequency analysis on the incoming signal, in accordance with the principles of the present invention, is to perform a so-called wavelet analysis on the incoming signal. Wavelet analysis involves the act of breaking down a signal into a set of simpler elements, called wavelets. The wavelets are basically localized waveforms that last for only a few cycles. Thus, according to wavelet analysis, a wavelet representation of a signal is the set of wavelets that can be superposed to form the waveform of the signal.

Wavelet analysis can be explained by analogy to Fourier analysis. A Fourier transform represents a signal as a superposition of sinusoids with different frequencies, and the Fourier coefficients represent the contribution of the sinusoid at these frequencies. Similarly, a wavelet transform represents a signal as a sum of wavelets with different widths, called dilations, and amplitudes, called scalings, and the wavelet coefficients provide a measure of the contributions of each wavelet at these dilations and scalings.

For example, referring now to FIG. 5 there is shown a sawtooth signal 52 that is represented by a family of wavelets, or wavelet representation, 51. As shown, wavelet representation 51 includes 16 different wavelets, each having a different dilation and scaling. For example, wavelet 53 has a dilation 54 and a scaling 55, and wavelet 56 has a dilation 57 and a scaling 58. Wavelet representation 51 is referred to as the wavelet transform of sawtooth signal 52, and sawtooth signal 52 is referred to as the inverse transform of the wavelet representation 51.

Both the wavelet transform and the inverse transform are arrived at according to known algorithms. For example, one illustrative algorithm used to compute both the wavelet transform and the inverse transform of a waveform is the fast pyramid algorithm described by A. Bruce, D. Donoho and H. Y. Goo, in "Wavelet Analysis," IEEE Spectrum, October 1996, and incorporated herein by reference. The fast pyramid algorithm provides a "forward algorithm" that serves to compute the wavelet transform, and a "backward algorithm" that serves to compute the inverse transform. The forward algorithm uses a series of linear filters to decompose a signal into a set of filtered components. It is the waveforms of these filtered components that form the wavelet representation of the signal. The reverse algorithm uses a set of linear filters to combine the wavelets comprising the wavelet representation to form the signal.

Referring now to FIG. 6 there is shown a block diagram of an illustrative set of linear filters 600, used to decompose a signal 601 into a set of filtered components 615–622. As shown, the set of linear filters 600 has a first-line filter 602 which is connected to second-line filters 603 and 604. Second line filter 603 is connected to third-line filters 605 and 606, and second-line filter 604 is connected to third-line filters 607 and 608.

In operation, signal 601 is input into first-line filter 602 which decomposes signal 601 into a high-frequency filtered component 609 and a low-frequency filtered component 610. Second-line filter 503 decomposes high-frequency component 609 into high frequency filtered components 611 and 612, and second-line filter 604 decomposes low frequency filtered component 610 into low-frequency filtered components 613 and 614. Third-line filter 605 decomposes high frequency filtered component 611 into high frequency filtered components 615 and 616. Third-line filter 606 decomposes high-frequency filtered component 612 into high frequency filtered components 617 and 618. Third-line filter 607 decomposes low-frequency filtered component 613 into low-frequency filtered components 619 and 620. Third-line filter 608 decomposes low-frequency filtered component 614 into low-frequency filtered components 621 and 622.

The waveforms of the set of filtered components 615–622 that result by inputting signal 601 into the set of linear filters 600 is shown. The waveforms of frequency components 615–622 are a set of waveforms that can be superposed to form signal 601. As a result, it is the waveforms of frequency components 615–622 that form a wavelet representation of signal 601. Alternatively, a different set of linear filters may be chosen to decompose signal 601 into a different set of frequency components that provide a different set of waveforms, or wavelets. Thus, it can be understood that different sets of linear filters can decompose signal 601 into different wavelet representations.

Identifying the Time-Of-Arrival

The above-described time/frequency analysis can be used, in accordance with the principles of the present invention, to identify the time-of-arrival of the line-of-sight component of an incoming signal. For example, wavelet analysis can be used as a time/frequency analysis to identify the time-of-arrival of the line-of sight component of an incoming signal. Referring now to FIG. 7 there is shown one illustrative embodiment of a method 70 for using wavelet analysis for identifying the time-of-arrival of the line-of-sight component of an incoming signal, in accordance with the principles of the present invention.

As shown, method 70 begins at step 71 wherein the incoming signal is passed through a set a set of linear filters to obtain a wavelet representation of the incoming signal. The wavelet representation of the incoming signal identified at each instant in time is then compared, at step 72, to a wavelet representation of a transmitted signal. As stated above, although the exact nature of the transmitted signal is not known, the waveform of its frequency components can indeed be known to a great extent since they are a function of the carrier frequency and the type of modulation used. Thus, since the wavelet representation of a signal is dependent on the waveform of its frequency components, the wavelet representation of the transmitted signal can be estimated with great accuracy.

The instants in time wherein the wavelet representation of the incoming signal is substantially similar to, or matches, the wavelet representation of the transmitted signal (called the expected wavelet representation) are identified, at step 73, as the times-of-arrival of the multipath components of the incoming signal. Since the line-of-sight component of the incoming signal travels the shortest distance, the first-arriving, or earliest, time-of-arrival is identified, at step 74, as the time-of-arrival of the line-of-sight component of the incoming signal. As stated above, determining the time-of-arrival of the line-of-sight component using such a time/frequency analysis, reduces the inaccuracies associated with using a matched filter. Thus, method 70 increases the accuracy of the identified time-of-arrival of the line-of-sight component of the incoming signal over the prior art methods that utilize such a so-called matched filter method.

Figure 8:
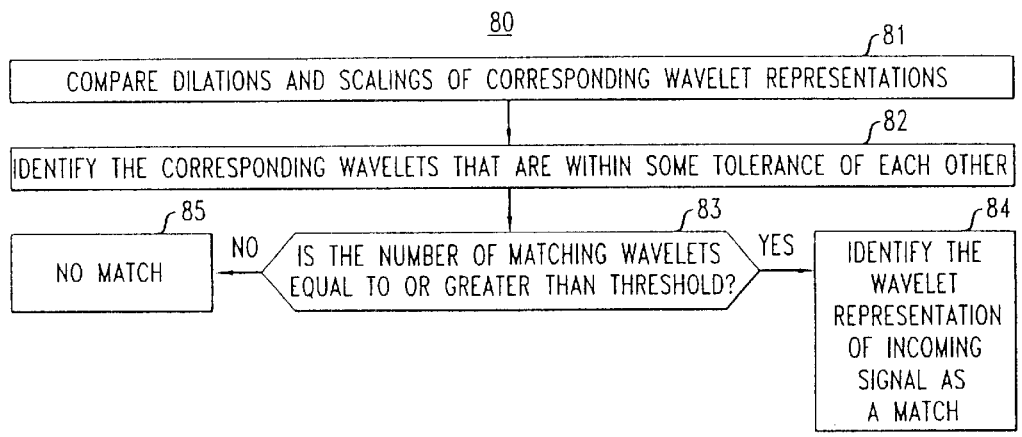
FIG. 8 is block diagram of an illustrative embodiment of a method for determining whether a wavelet representation of an incoming signal matches a wavelet representation of a transmitted signal.

An illustrative embodiment of a method 80 for determining whether the wavelet representation of the incoming signal matches the expected wavelet representation of the transmitted signal is shown in FIG. 8. As, shown, method 80 begins at step 81 wherein the dilations and scalings of the wavelets which represent the incoming signal are compared to the dilations and scalings of the "corresponding wavelets" which represent the transmitted signal. The term "corresponding wavelets" as used herein refers to the wavelet of the incoming signal and the wavelet of the transmitted signal that represent the waveform of the frequency band of its respective signal. At step 82, the corresponding wavelets that have dilations and scalings that are within some tolerance of each other are identified, and labeled as matching wavelets. The number of matching wavelets is then compared to a threshold number, at step 83. If the number of matching wavelets is equal to or greater than the threshold number then, at step 84, the wavelet representation of the incoming signal is said to match the wavelet representation of the transmitted signal. If, however, the number of matching wavelets is less than the threshold number then, at step 85, the wavelet representation of the incoming signal is said to not match the wavelet representation of the transmitted signal. As stated above, each instant at which a match is identified can therefor be identified as a time-of-arrival of a multipath component of the incoming signal Using an RF Model to Adjust an Identified Time-Of-Arrival As described above and shown in FIGS. 2 and 4, the identified time-of-arrival of the line-of-sight component of the incoming signal can be "time-shifted" when the line-of-sight component is blocked (i.e. prevented from arriving at the receiver location).

The present inventor has found that the amount of time-shift due to such a blocked line-of-sight path directly depends on the scattering hostility of the RF environment in which the incoming signal traveled. In particular, the present inventor has found that the amount of time-shift due to such a blocked line-of-sight path can be reduced by adjusting the identified time-of arrival of the first-arriving component of the incoming signal by an amount based on a parameter that characterizes the scattering hostility of the RF environment in which the incoming signal traveled.

Figure 9:
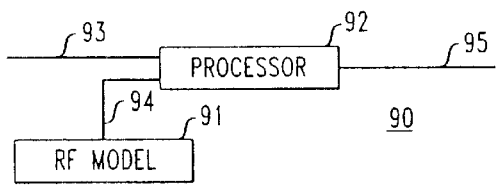
FIG. 9 is a block diagram of an illustrative embodiment of an apparatus for adjusting the identified time-of-arrival of an incoming signal.

Referring now to FIG. 9 there is shown one illustrative embodiment of a device 90 for adjusting the identified time-of-arrival of the line-of-sight component of an incoming signal. As shown, device 90 has an RF model 91 connected to a processor 92. RF model 91 has a set of parameters, each parameter characterizing the scattering hostility of a given region of an RF environment. Processor 92 has inputs 93 and 94, and output 95.

In operation, processor 92 obtains, at input 93, the time-of-arrival identified for the first-arriving component of an incoming signal that traveled through a given region of an RF environment. Processor 92 obtains, at input 94, a parameter that characterizes the scattering hostility in the given region of the RF environment, from RF model 91. The given region through which the incoming signal traveled is determined by identifying the direction from which the incoming signal traveled and/or the strength of the incoming signal. The methods by which such signal direction and signal strength are determined are well known in the art. Based on the obtained parameter, processor 92 determines the amount of time-shift of the obtained time-of-arrival that is due to scattering and/or multipath in the RF environment. Then, based on the time-shift information, processor 92 computes and outputs from output 95 an adjusted time-of-arrival that more accurately reflects the time at which the line-of-sight component would have arrived in a scatter-free environment.

As stated above, each parameter is a measure of the amount of multipathing, and the amount of "time-shift" that a given signal would incur in a given region of the RF environment. As a result, each parameter of RF model 91 indicates the relative amount of "time-shift" that would occur if a signal were to travel in the respective region. It can therefore be understood that a parameter of RF model 91 that characterizes a given region as having a greater scattering hostility than another region, necessarily indicates that the amount of "time-shift" that would occur if the incoming signal were to travel in that given region is greater than the amount of time shift that would occur in the other region.

Processor 92 can determine the amount of such a time shift that would occur in a given region by comparing the value of a parameter that characterizes the scattering hostility of the given region to the value of a basis parameter.

The term basis parameter as used herein refers to a parameter that characterizes the scattering hostility in a given region wherein the amount of time-shift that results when a signal travels in that given region is known. Thus, a basis parameter is a parameter that has a known associated time-shift.

Figure 10:
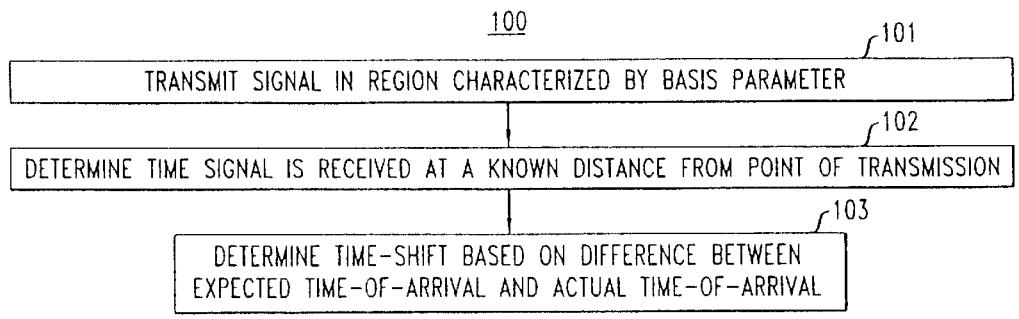
FIG. 10 is a block diagram of an illustrative embodiment of a method for determining a basis parameter used to adjust an identified time-of-arrival of an incoming signal.

Referring now to FIG. 10, there is shown an illustrative embodiment of a method 100 for determining a basis parameter. As shown, method 100 begins at step 101 wherein a signal is transmitted in a region characterized by the basis parameter. The time at which the signal is received at a known distance from the wireless terminal is determined at step 102. The difference between the actual time-of-flight (the time it took for the first-arriving component of the signal to actually travel the given distance) and the expected time-of-flight (i.e. the time the signal would have traveled the given distance along the line-of-sight path) is determined at step 103. The calculated difference is thereby the known time-shift associated with the basis parameter.

Referring now back to FIG. 9, processor 92 determines the amount of time shift of the time-of-arrival obtained at input 93 by comparing the parameter obtained at input 94 to a so-called basis parameter, and adjusting the value of the known time-shift associated with the basis parameter by an amount based on the difference between the value of the basis parameter and the value of the given parameter. For example, the known time-shift associated with the basis parameter can be adjusted in direct proportion to the difference between the value of the basis parameter and the value of the given parameter. The resultant adjusted time shift is the time shift of the identified time-of arrival of the first arriving component of the incoming signal, due to such a line-of-sight path, as described above. Processor 92 can then adjust the identified time of arrival, obtained at input 93, by the time-shift, and output the adjusted time-of-arrival through output 95.

Determining the Parameters

The term parameter as used herein refers to any parameter or so-called dimension that is capable of defining or describing a chaotic process or system in terms of a measure of some aspect of that system. One type of parameter or dimension that can be used to define such a chaotic process is a fractal dimension. Fractal dimensions are described by A. P. Pentland in "Fractal-Based Description of Natural Scenes," IEEE Transactions on Pattern Analysis and Machine Intelligence, Vol. PAMI-6, No. 6, November 1984, and incorporated herein by reference.

As noted above, a fractal dimension is a parameter that defines a chaotic system by characterizing the system in terms of a measure of so-called self-similarity. For example, a fractal dimension has been used to define the shape of a mountainous landscape by characterizing the amount of self-similarity that exists in the shape of the landscape. The amount of self-similarity in the shape of the landscape is the number of times a particular shape is repeated in the shape of the landscape itself The particular shape is the largest shape found in the actual landscape that can be used to define or re-create each piece of the actual landscape. As a result, the fractal dimension determined for any given landscape provides a measure of the size of the particular repeated shape with respect to the size of the landscape itself, and thus a characterization of the landscape itself.

Just like a fractal dimension can be used as parameter to characterize the a chaotic system such as a mountainous landscape, so can a fractal dimension be used as a parameter to characterize a chaotic system such as an RF environment. In particular, a fractal dimension can be used to characterize the scattering hostility of an RF environment by providing a measure of the number of times a similar shape (i.e. the various multipath components of the incoming signal) is repeated in the waveform of the incoming signal that traveled in the RF environment. By providing a measure of the number of multipath components of the incoming signal, the fractal dimension actually provides a measure or characterization of the scattering hostility of the RF environment. Thus, a set of such fractal dimensions forms an RF model of the RF environment.

Figure 11:
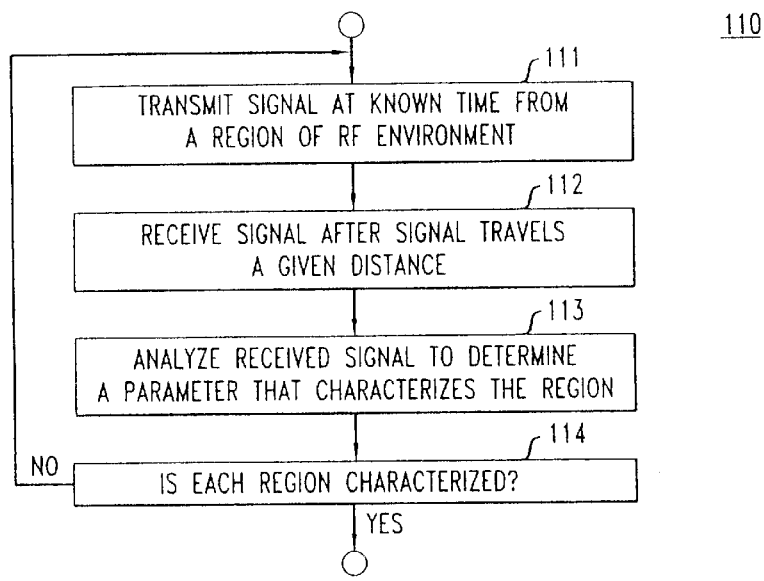
FIG. 11 is a block diagram of an illustrative embodiment of a method for forming an RF model of an RF environment.

Referring now to FIG. 11 there is shown an illustrative method 110 for forming such an RF model of an RF environment. As shown, method 110 begins at step 111 wherein an RF signal having a given waveform is transmitted at a known time from a given region of an RF environment. The RF signal, after traveling a given distance in the given region of the RF environment is received, step 112. The received signal, or so-called incoming signal, is analyzed, step 113, to determine a parameter that characterizes the scattering hostility of that region of the RF environment. Then, at decision step 114, method 110 checks whether a parameter has been determined for each region of the RF environment. If such a parameter has been determined for each region, method 110 ends, otherwise steps 111–113 are repeated until such time that each region has a parameter determined therefor.

It should be understood that no region of the RF environment is limited to being characterized by one such parameter. Rather each region can be characterized, for example, by a plurality of parameters, or a single parameter that is an average of a plurality of parameters. In addition an RF environment is not limited to a specific number of regions. The RF environment, for example, can be a single region or one hundred regions.

Moreover, each parameter of a given RF model is not limited to characterizing a region of any particular size. For example, a given RF model can be compose of a set of parameters wherein each parameter characterizes the scattering hostility in a region having the same size and shape as every other region. Or, for example, each parameter can characterize a region having an arbitrary size and shape. Or, for example, each parameter characterizes a region having size and shape based on some criterion such as the physical profile (i.e. rural, urban, suburban, etc.) of the region.

In addition, a set of such parameters that characterize any given region can be determined as a function of time. That is, each determined parameter may be a time-varying function of the scattering hostility of a given region of the RF environment.

Advantageously, a set of such parameters can be used as an RF model of the RF environment to aid in the design of a wireless communication system. For example, since each parameter defines the amount of multipath that a given signal would incur if the signal were to travel in a region of the RF environment, each parameter can be used to predict the amount a signal would multipath if the signal were to propagate in that respective region. Based on the prediction, a system designer could estimate the amount the waveform of the RF signal would change shape as a result of traveling in the given region, and thus could determine whether a given receiver would be capable of detecting and/or recognizing the transmitted signal after traveling in the RF environment. Such information, as described above, may be critical in testing the design of a wireless system before incurring the cost of building the system itself In addition, a set of such parameters can advantageously be used to adjust the identified time of arrival of the line-of-sight component of the incoming signals received at a plurality of locations in an RF environment, and thus provide a geolocation system with more-accurate time-of-arrival information for determining the geolocation of a wireless terminal operating in the RF environment.

Determining the Geolocation of a Wireless Terminal

Figure 12:
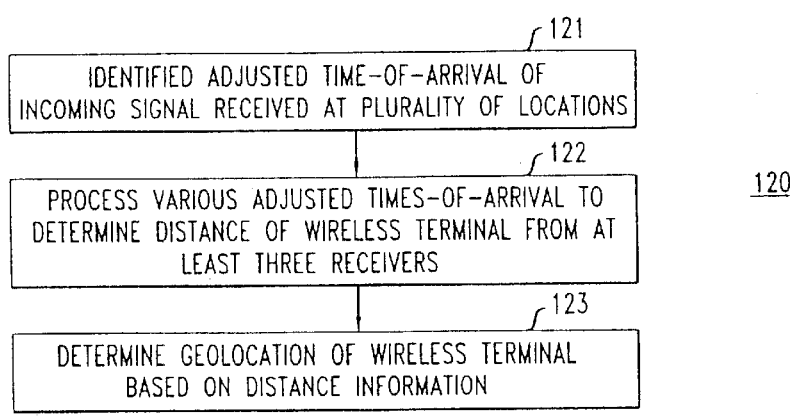
FIG. 12 is a block diagram of an illustrative embodiment of a method for determining the geolocation of a wireless terminal based on adjusted times-of-arrival in accordance with the principles of the present invention.

Referring now to FIG. 12, there is shown a method 120 for determining the geolocation of a wireless terminal, according to the principles of the present invention. As shown, method 120 begins at step 121 wherein the adjusted time-of-arrival of the line-of-sight component is identified for the incoming signal received at a plurality of receiver locations. Then, step 122, the various times-of-arrival are processed to determine the distance of the wireless terminal from at least three receiver locations. From this distance information, the geolocation of the wireless terminal is identified, step 123.

The processing performed to determine the geolocation of a wireless terminal, based on the time-of-arrival of the line-of-sight component of the incoming signal received at the at least three receiver locations, is well-known in the art. For example, one illustrative method for using such times-of-arrival information to determining the geolocation of a vehicle is disclosed by J. Brooks Chadwick and J. L. Bricker in "A Vehicle Location Solution Approach," IEEE Position Location and Navigation Symposium, 1990, and incorporated herein by reference.

It should be noted that using an adjusted time-of-arrival of the line-of-sight component of the various incoming signals, as computed above, increases the accuracy of the just-described processing for determining the geolocation of the wireless terminal. This is due to the direct dependence of the accuracy of the geolocation calculation on the accuracy of time-of-arrival of the line-of-sight component of the incoming signal. Advantageously, determining the geolocation of a wireless unit as described above, does not require the consumption of additional bandwidth, or the increased in cost associated with adding hardware to the wireless terminal, as in some of the prior art solutions.

While the invention has been particularly shown and described with reference to various embodiments, it will be recognized by those skilled in the art that modifications and changes may be made to the present invention without departing from the spirit and scope thereof. As a result, the invention in its broader aspects is not limited to specific details shown and described herein. Various modifications may be made without departing from the spirit or scope of the general inventive concept as defined by the appended claims.

I claim:

1. A method of determining geolocation for a wireless terminal, comprising the steps of:

receiving incoming signals from the wireless terminal at a plurality of locations including at least one multipath component;

performing, at each location, a time/frequency analysis on a first-arriving component of a respective incoming signal transmitted to each location by the wireless terminal, so as to identify the time-of-arrival of the first-arriving component of the incoming signal at each location;

determining an adjusted time-of-arrival at each location for the identified first-arriving component, by an amount that is based on a fractal dimension that characterizes the scattering hostility of a given region in an RF environment through which the incoming signal has traveled from the wireless terminal to the particular location, said fractal dimension being compared against a basis parameter that has a known associated time-shift, the difference being used to determine the adjusted time-of-arrival for said first-arriving component at each location, the adjusted time-of-arrival determination thereby compensating for any time-shift between the first arriving component and a next-arriving component due to scattering; and determining the geolocation of said wireless terminal based on said adjusted time-of-arrival determination.

2. The method of claim 1 wherein said step of determining the geolocation of the wireless terminal includes the step of determining the distances between said wireless terminal and at least three of said plurality of locations, based on said determined times-of-arrival of the first-arriving component of each of said incoming signals.

3. The method of claim 1, wherein the geolocation of said wireless terminal is determined from adjusted first-arriving components for at least three locations.

4. The method of claim 1 wherein said step of performing the time/frequency analysis includes performing wavelet analysis on each of said incoming signals.

5. An apparatus for determining geolocation for a wireless terminal, comprising:

means for receiving incoming signals at a plurality of locations including at least one multipath component;

means for performing, at each location, a time/frequency analysis on a first-arriving component of a respective incoming signal transmitted to each location by the wireless terminal, so as to identify the time-of-arrival of the first-arriving component of the incoming signal at each location;

means for determining an adjusted time-of-arrival at each location for the identified first-arriving component, by an amount that is based on a fractal dimension that characterizes the scattering hostility of a given region in an RF environment through which the incoming signal has traveled from the wireless terminal to the particular location, said fractal dimension being compared against a basis parameter that has a known associated time-shift, the difference being used to determine the adjusted time-of-arrival for said first-arriving component at each location, the adjusted time-of-arrival determination thereby compensating for any time-shift between the first arriving component and a next-arriving component due to scattering; and means for determining the geolocation of said wireless terminal based on said adjusted time-of-arrival determination.

6. The apparatus of claim 5 wherein said means for determining the geolocation of the wireless terminal includes means for determining the distances between said wireless terminal and at least three of said plurality of locations, based on said determined times-of-arrival of the first-arriving component of each of said incoming signals.

7. The apparatus of claim 5 wherein said means for determining the geolocation of said wireless terminal determines the geolocation of said wireless terminal from adjusted first-arriving components for at least three locations.

8. The apparatus of claim 5 wherein said means for performing the time/frequency analysis includes performing wavelet analysis on each of said incoming signals.

* * * * *